United States Patent
Ochiai et al.

(10) Patent No.: US 9,482,894 B2
(45) Date of Patent: *Nov. 1, 2016

(54) LIQUID CRYSTAL DISPLAY DEVICE

(71) Applicants: Japan Display, Inc., Tokyo (JP); Panasonic Liquid Crystal Display Co., Ltd., Hyogo-ken (JP)

(72) Inventors: Takahiro Ochiai, Chiba (JP); Tohru Sasaki, Mobara (JP); Osamu Ito, Hitachi (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/289,000

(22) Filed: May 28, 2014

(65) Prior Publication Data

US 2014/0267963 A1 Sep. 18, 2014

Related U.S. Application Data

(63) Continuation of application No. 13/792,498, filed on Mar. 11, 2013, now Pat. No. 8,749,739, which is a continuation of application No. 13/605,195, filed on Sep. 6, 2012, now Pat. No. 8,395,730, which is a continuation of application No. 12/495,910, filed on Jul. 1, 2009, now Pat. No. 8,269,925.

(30) Foreign Application Priority Data

Jul. 1, 2008 (JP) .................................. 2008-171954

(51) Int. Cl.
*G02F 1/1333* (2006.01)
*G02F 1/1335* (2006.01)
*G02F 1/1343* (2006.01)

(52) U.S. Cl.
CPC ... *G02F 1/133514* (2013.01); *G02F 1/133512* (2013.01); *G02F 1/134363* (2013.01); *G02F 2201/52* (2013.01); *G09G 2300/0434* (2013.01); *G09G 2300/0465* (2013.01)

(58) Field of Classification Search
CPC .................. G02F 1/133514; G02F 1/133512; G02F 1/134363; G02F 2201/52; G09G 2300/0434; G09G 2300/0465
USPC .......................................... 349/106, 109–110
See application file for complete search history.

(56) References Cited

U.S. PATENT DOCUMENTS

| | | | |
|---|---|---|---|
| 5,905,553 A | 5/1999 | Matsukawa et al. | |
| 6,867,545 B2 * | 3/2005 | Lee | H01J 11/12 313/240 |
| 7,133,093 B2 | 11/2006 | Ochiai et al. | |
| 2005/0052590 A1 | 3/2005 | Ochiai | |

(Continued)

FOREIGN PATENT DOCUMENTS

JP 11-038426 2/1999
JP 2005-084097 3/2005

*Primary Examiner* — Nathanael R Briggs
(74) *Attorney, Agent, or Firm* — Typha IP LLC

(57) ABSTRACT

A liquid crystal display device includes first and second substrates with liquid crystal sandwiched therebetween. A first blue, a red, a green, and a second blue color filters are disposed between the first substrate and the second substrate, and arranged in a first direction. First to third light blocking films are respectively disposed between the first blue and the red color filters, between the red and the green color filters, and between the green and the second blue color filters. A distance Lr between a first central line of a part of the first light blocking film and a second central line of a width the second light blocking film is larger than a distance Lg between the second central line and a third central line of a width of the third blocking film.

7 Claims, 4 Drawing Sheets

(56) References Cited

U.S. PATENT DOCUMENTS

| | | | |
|---|---|---|---|
| 2008/0055500 A1* | 3/2008 | Maeda | G02B 27/2214 349/15 |
| 2008/0067595 A1* | 3/2008 | Kawase | 257/350 |
| 2008/0143936 A1* | 6/2008 | Wang | 349/109 |
| 2008/0186435 A1 | 8/2008 | Son | |
| 2012/0043678 A1 | 2/2012 | Numata | |

* cited by examiner

LIQUID CRYSTAL DISPLAY DEVICE

CROSS REFERENCE TO RELATED APPLICATION

This application is a continuation of U.S. application Ser. No. 13/792,498, filed Mar. 11, 2013, which is a continuation of U.S. application Ser. No. 13/605,195, filed Sep. 6, 2012, now U.S. Pat. No. 8,395,730, which is a continuation of U.S. application Ser. No. 12/495,910, filed Jul. 1, 2009, now U.S. Pat. No. 8,269,925, the contents of which are incorporated herein by reference.

The present application claims priority from Japanese applications JP2008-171954 filed on Jul. 1, 2008, the content of which is hereby incorporated by reference into this application.

BACKGROUND OF THE INVENTION

1. Field of the Invention

The present invention relates to a liquid crystal display device, and more particularly to a liquid crystal display device which performs a color display.

2. Description of the Related Art

In a liquid crystal display device which performs a color display, a unit pixel for color display is constituted of neighboring sub pixels of three or more colors.

Each sub pixel includes a colored layer (color filter) corresponding to each sub pixel, and a viewer can sense a predetermined color due to mixing of lights which pass through the colored layers of the respective sub pixels.

To realize a monochromatic display, the sub pixels corresponding to the color are turned on and, at the same time, the sub pixels corresponding to other colors are turned off.

Further, in performing such a monochromatic display, when a display screen is viewed from oblique directions, there arises a drawback (expressed as color mixing in this specification) in which color of the sub pixel in an OFF state which is arranged adjacent to the sub pixel in an ON state and is on a side close to the viewer appears to be mixed with color of the sub pixel in an ON state. This is because that a path through which light passes the sub pixel in an ON state and a path through which light passes other sub pixel adjacent to the sub pixel in an ON state exist in a path of light from a backlight, for example.

When substrates which are arranged to face each other in an opposed manner with liquid crystal sandwiched therebetween are fixed in a displaced manner in the direction that sub pixels of different colors are arranged due to irregularities in the manufacture of a liquid crystal display device, in a monochromatic display, the colored layer of other sub pixel adjacent to the sub pixel in an ON state approaches a region of the sub pixel in an ON state or overlaps with the region of the sub pixel in an ON state and hence, the drawback on color mixing becomes particularly conspicuous. This is because that the colored layer of other sub pixel is arranged adjacent to or overlaps with the region of the sub pixel in an ON state and hence, a width of the path of light expands.

Recently, due to the development of a liquid crystal display device which exhibits a so-called excellent wide viewing angle, chances that the liquid crystal display device is viewed from oblique directions are increased and hence, the deterioration of image quality due to the above-mentioned color mixing becomes more easily recognized.

To cope with such a situation, conventionally, a drawback attributed to the above-mentioned color mixing is obviated by uniformly increasing a width of light blocking layers (black matrixes) each of which is arranged between respective sub pixels. That is, the above-mentioned color mixing is obviated by blocking light which passes through the color filter of other sub pixel adjacent to the sub pixel in an ON state by the black matrix having a large width.

As documents relating to the present invention, JP-A-11-38426 (patent document 1) and JP-A-2005-84097 (patent document 2) are named.

SUMMARY OF THE INVENTION

However, when the width of black matrixes each of which is arranged between the respective sub pixels is uniformly increased as described above, a substantial region of a pixel excluding a region for forming the black matrix is narrowed thus giving rise to a drawback that a numerical aperture of the pixel is lowered.

This drawback lowers brightness of the liquid crystal display device.

It is an object of the present invention to provide a liquid crystal display device which can obviate color mixing of colors of sub pixels when a display screen is viewed from oblique directions while enhancing a numerical aperture of a pixel.

In a liquid crystal display device, retardation of liquid crystal is set such that efficiency that light which passes through liquid crystal (transmissivity) and a transmissivity ratio (transmission contrast ratio) between an ON state and an OFF state is increased. In this case, when retardation of liquid crystal is set such that the transmissivity ratio between an ON state and an OFF state is increased, light which passes through liquid crystal has property of becoming yellowish compared with color of the light before the light passes through liquid crystal.

Accordingly, to prevent the display from becoming yellowish, it may be possible to adopt a method which uses a light source having bluish color which is a complementary color of yellow.

In a liquid crystal display device which uses such a bluish light source, when a panel is viewed from oblique directions in a monochromatic display, color mixing which is generated by mixing blue becomes more easily visually recognized.

That is, in a red monochromatic display, when the display screen is viewed from oblique directions on a side where the blue pixel is arranged adjacent to the red pixel, color mixing which is caused by mixing blue is emphasized due to a bluish light source and hence, a drawback of color mixing becomes conspicuous. On the other hand, in the red monochromatic display, when the display screen is viewed from oblique directions on a side where the green pixel is arranged adjacent to the red pixel, a drawback of color mixing generated by mixing green is hardly visually recognized compared with the drawback of color mixing generated by mixing blue.

From such a phenomenon, it is understood that it is necessary to increase a width of the black matrix between the red pixel and the blue pixel, while it is unnecessary to increase a width of the black matrix between the red pixel and the green pixel. Accordingly, compared with the case in which the width of the black matrixes is uniformly increased, a numerical aperture of the pixel can be enhanced.

Also in this case, by arranging the black matrix between the red pixel and the blue pixel toward a center side of the blue pixel in a displaced manner, it is unnecessary to increase the width of the black matrix. This is because that due to the displacement of the black matrix between the red pixel and the blue pixel toward the center side of the blue pixel, as described above, when the display screen is viewed from oblique directions on a side where the blue pixel is arranged adjacent to the red pixel in a red monochromatic display, the blue light can be blocked by the black matrix.

The liquid crystal display device of the present invention has the following constitutions, for example.

(1) The present invention is directed to a liquid crystal display device including: a pair of substrates which is arranged to face each other in an opposed manner with liquid crystal sandwiched therebetween; light blocking films and color filters which are formed on one substrate out of the pair of substrates; and red sub pixels, green sub pixels, and blue sub pixels which are determined based on colors of the color filters, wherein the red sub pixels, the green sub pixels and the blue sub pixels are arranged such that the sub pixels having the same color are not arranged adjacent to each other in the first direction, the light blocking film is arranged on a boundary portion between the red sub pixel and the green sub pixel arranged adjacent to each other, on a boundary portion between the green sub pixel and the blue sub pixel arranged adjacent to each other, and on a boundary portion between the blue sub pixel and the red sub pixel arranged adjacent to each other, and a width of the light blocking film arranged on the boundary portion between the blue sub pixel and the sub pixel of other color is set larger than a width of the light blocking film arranged on the boundary portion between the red sub pixel and the green sub pixel.

(2) In the liquid crystal display device of the present invention having the constitution (1), assuming the width of the light blocking film arranged on the boundary portion between the red sub pixel and the blue sub pixel as Wrb, the width of the light blocking film arranged on the boundary portion between the green sub pixel and the red sub pixel as Wgr, and the width of the light blocking film arranged on the boundary portion between the blue sub pixel and the green sub pixel as Wbg, a relationship of Wrb>Wbg>Wgr is established.

(3) In the liquid crystal display device of the present invention having the constitution (1), drain signal lines which supply video signals are formed on another substrate out of the pair of substrates, and the light blocking film is formed so as to cover the drain signal line as viewed in a plan view.

(4) The present invention is also directed to a liquid crystal display device including: a pair of substrates which is arranged to face each other in an opposed manner with liquid crystal sandwiched therebetween; light blocking films and color filters which are formed on one substrate out of the pair of substrates; and red sub pixels, green sub pixels, and blue sub pixels which are determined based on colors of the color filters, wherein the red sub pixels, the green sub pixels and the blue sub pixels are arranged such that the sub pixels having the same color are not arranged adjacent to each other in the first direction, the light blocking film is arranged on a boundary portion between the red sub pixel and the green sub pixel arranged adjacent to each other, on a boundary portion between the green sub pixel and the blue sub pixel arranged adjacent to each other, and on a boundary portion between the blue sub pixel and the red sub pixel arranged adjacent to each other, and assuming a distance between a center line of a width of the light blocking film arranged on a boundary portion between the red sub pixel and the blue sub pixel arranged adjacent to the red sub pixel and a center line of a width of the light blocking film arranged on a boundary portion between the red sub pixel and the green sub pixel arranged adjacent to the red sub pixel as Lr, and assuming a distance between a center line of a width of the light blocking film arranged on a boundary portion between the blue sub pixel and the green sub pixel arranged adjacent to the blue sub pixel and a center line of a width of the light blocking film arranged on a boundary portion between the blue sub pixel and the red sub pixel arranged adjacent to the blue sub pixel as Lb, a relationship of Lr>Lb is established.

(5) In the liquid crystal display device of the present invention having the constitution (4), assuming a distance between a center line of a width of the light blocking film arranged on a boundary portion between the green sub pixel and the blue sub pixel arranged adjacent to the green sub pixel and a center line of a width of the light blocking film arranged on a boundary portion between the green sub pixel and the red sub pixel arranged adjacent to the green sub pixel as Lg, a relationship of Lr>Lg>Lb is established.

(6) In the liquid crystal display device of the present invention having the constitution (4), drain signal lines which supply video signals are formed on another substrate out of the pair of substrates, and the light blocking film is formed so as to cover the drain signal line as viewed in a plan view.

Here, the above-mentioned constitutions constitute merely one example of the present invention, and the present invention can be suitably modified without departing from the gist of the technical concept of the present invention. Further, constitutional examples of the present invention other than the above-mentioned constitutions will become apparent from the description of the whole specification or drawings which explain the present application.

The liquid crystal display device having such a constitution can obviate color mixing of colors when a display screen is viewed from oblique directions while enhancing a numerical aperture of a pixel.

Other advantageous effects obtained by the present invention will become apparent from the description of the whole specification.

DESCRIPTION OF THE PREFERRED EMBODIMENT

Embodiments of the present invention are explained in conjunction with drawings. Here, in all embodiments and all drawings used for explaining the present invention, identical or similar constitutional parts are given same symbols and their repeated explanation is omitted.

(Embodiment 1)
(Equivalent Circuit of Pixel)

Figure 2:
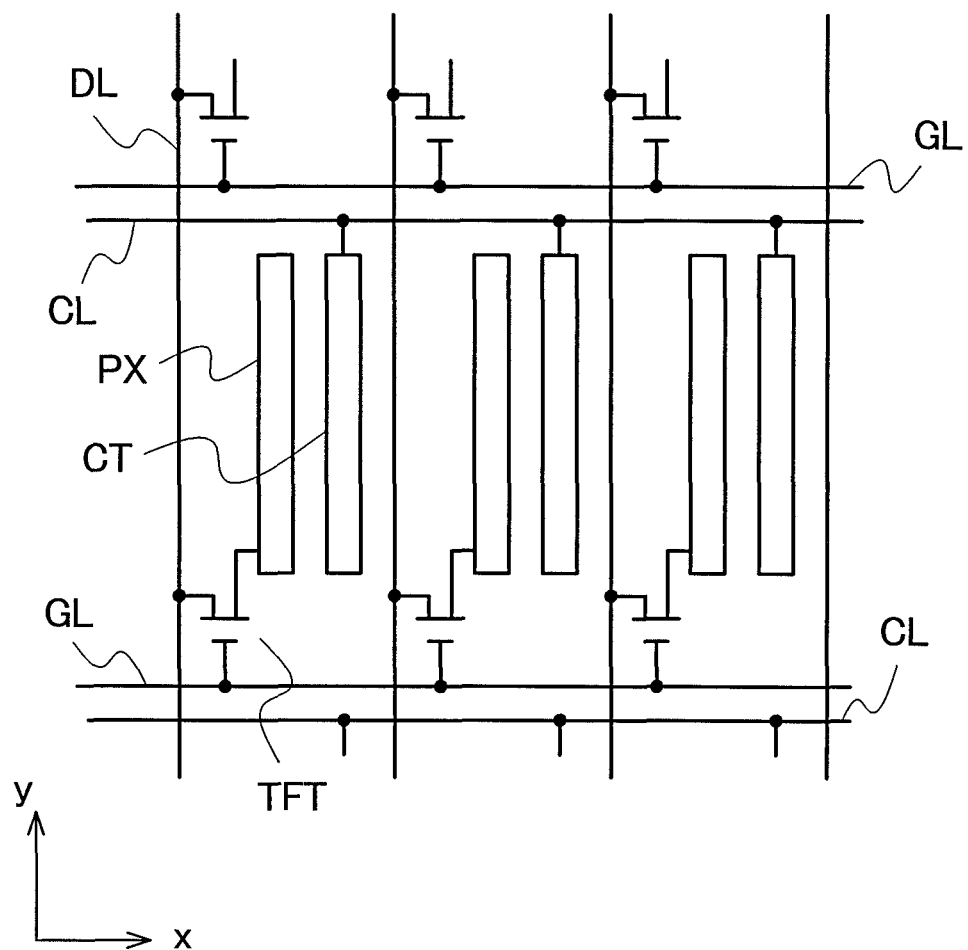
FIG. 2 is an equivalent circuit diagram in a pixel of the liquid crystal display device of the present invention.

FIG. 2 shows an equivalent circuit of a so-called IPS (In Plane Switching)-type liquid crystal display device. Although FIG. 2 shows the equivalent circuit, the equivalent circuit corresponds to an actual liquid crystal display device geometrically.

As shown in FIG. 2, the liquid crystal display device includes gate signal lines GL which extend in the x direction and are arranged parallel to each other in the y direction in the drawing and drain signal lines DL which extend in the y direction and are arranged parallel to each other in the x direction in the drawing. A region surrounded by a pair of neighboring gate signal lines GL and a pair of neighboring drain signal lines DL constitutes a pixel region. Here, a mass of the pixel regions constitutes a display region.

The pixel region includes a thin film transistor TFT which constitutes a switching element, and the thin film transistor TFT is turned on in response to a signal (scanning signal) from the gate signal line GL.

Further, the pixel region includes a pixel electrode PX, and a signal (video signal) is supplied to the pixel electrode PX from the drain signal line DL via the thin film transistor TFT. Further, the pixel region includes a counter electrode CT, and a reference signal which becomes the reference with respect to the video signal is supplied to the counter electrode CT via a counter voltage signal line CL.

An electric field is generated between the pixel electrode PX and the counter electrode CT by supplying the video signal to the pixel electrode PX, and molecules of liquid crystal in the pixel region are activated by the electric field.

In the liquid crystal display device having such a constitution, in response to the sequential supply of a scanning signal to the respective gate signal lines GL, a pixel row in which the pixels are arranged parallel to each other in the x direction in the drawing is selected. Here, in response to the supply of a predetermined video signal to each drain signal line DL, the respective pixels in the pixel row are driven thus allowing the display region to display an image.

(Constitution of Pixel)

Figure 1:
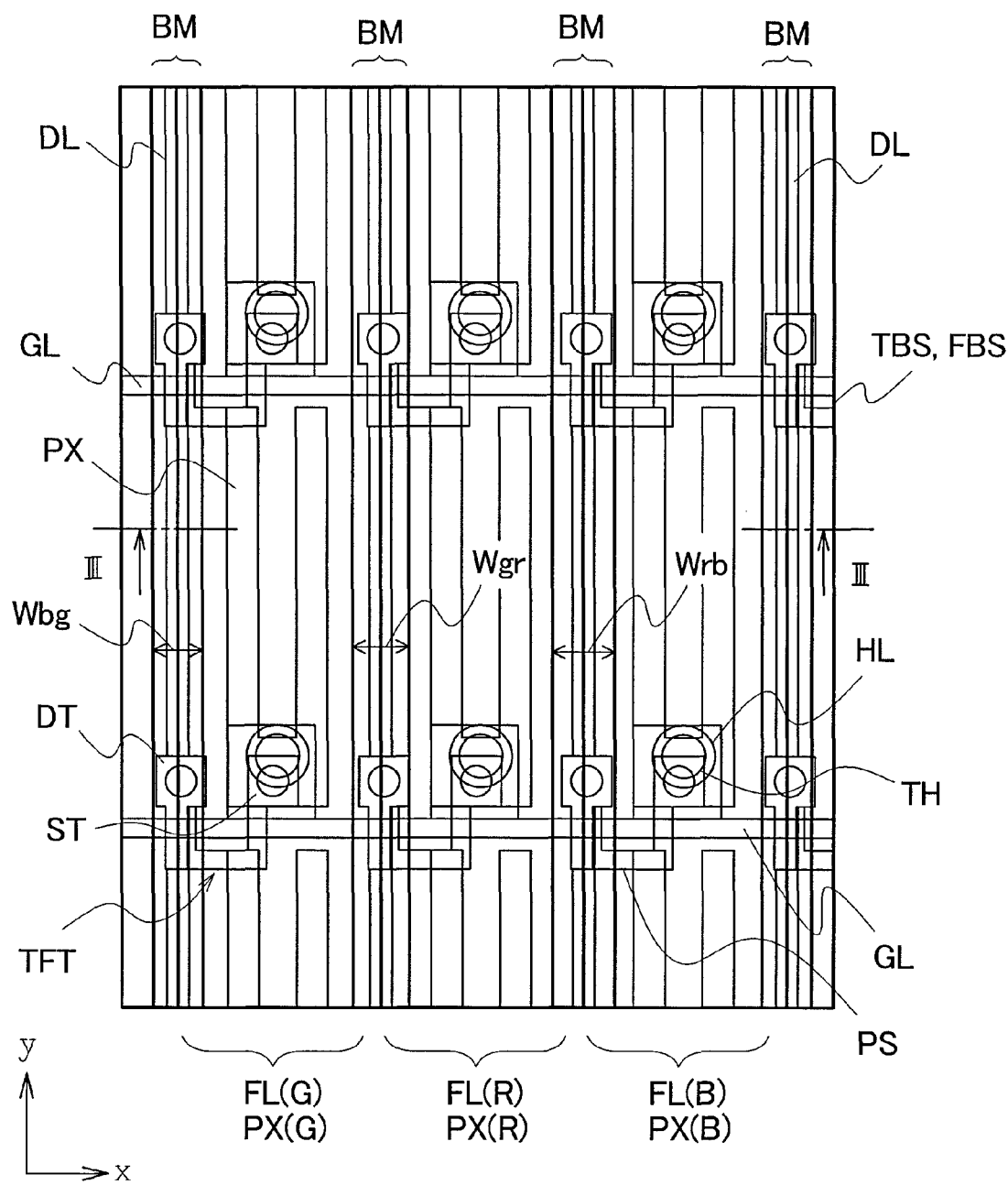
FIG. 1 is a plan view showing one embodiment of a liquid crystal display device of the present invention.

FIG. 1 is a constitutional view showing one embodiment of the liquid crystal display device of the present invention, and is a plan view showing the constitution of a liquid-crystal-side surface of a pair of substrates which is arranged to face each other in an opposed manner with liquid crystal sandwiched therebetween.

Figure 3:
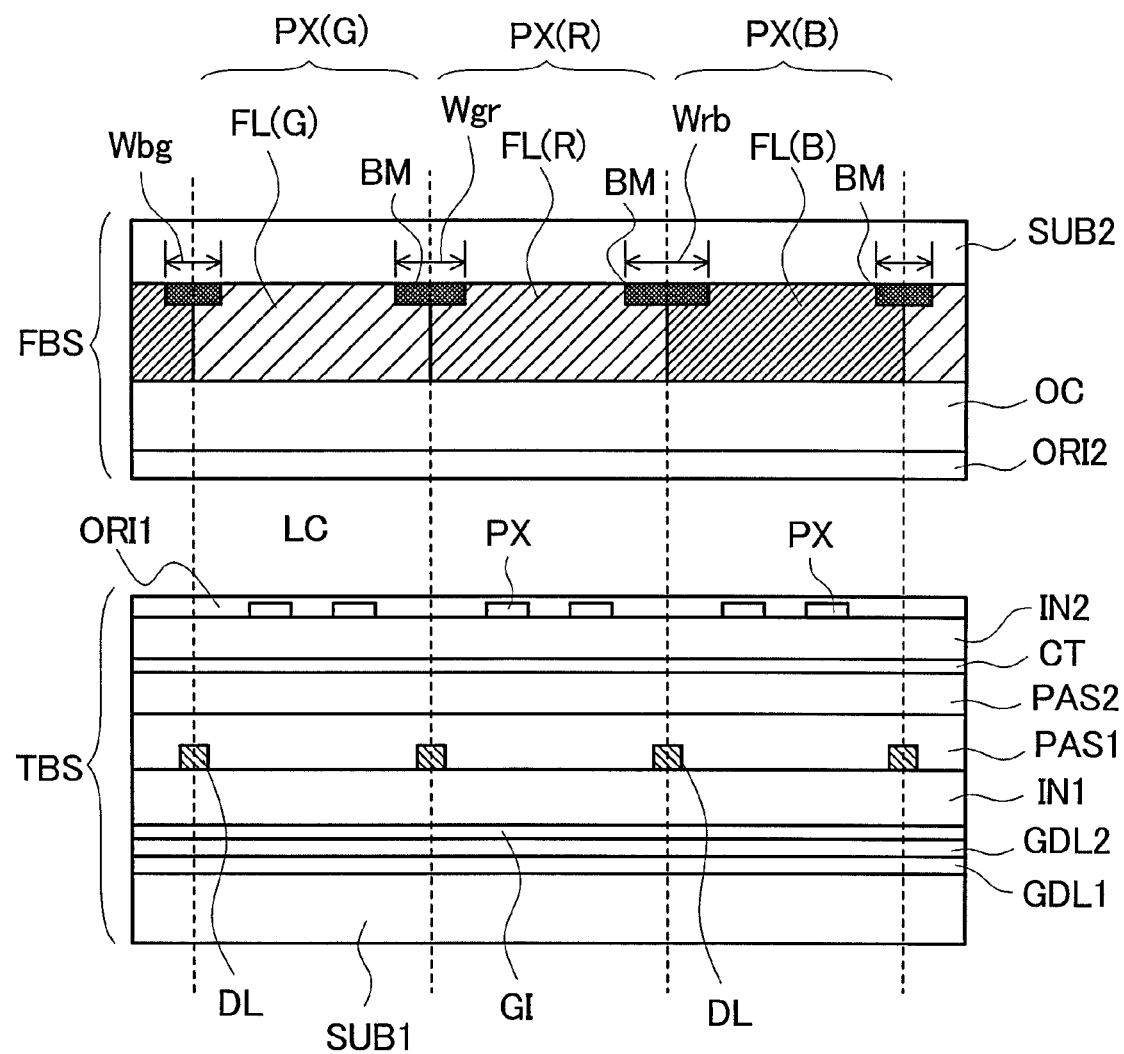
FIG. 3 is a cross-sectional view taken along a line III-III in FIG. 1.

That is, FIG. 1 shows a TFT substrate TBS on which parts which constitute the equivalent circuit shown in FIG. 2 are formed, and a counter substrate FBS which is arranged to face the TFT substrate TBS in an opposed manner with the liquid crystal sandwiched therebetween. FIG. 1 is also a plan view of the liquid crystal display device as viewed from a counter substrate side in a see-through manner. Here, FIG. 3 is a cross-sectional view taken along a line III-Ill in FIG. 1.

The TFT substrate TBS is constituted as follows. First of all, the TFT substrate TBS includes a substrate SUB1 (see FIG. 3) made of glass, for example, and a background films GDL1, GDL2 (see FIG. 3) are formed on a liquid-crystal-LC-side surface of the substrate SUB1. The background films GDL1, GDL2 prevent impurities in the inside of the substrate SUB1 from entering into semiconductor layers of the thin film transistors TFT described later.

A semiconductor layer PS made of poly-silicon (p-Si), for example, is formed in a region of an upper surface of the background film GDL2 where the thin film transistor TFT is formed for every pixel region, and an insulation film GI (see FIG. 3) is formed so as to cover the semiconductor layer PS. The insulation film GI functions as a gate insulation film in the region where the thin film transistor TFT is formed.

On an upper surface of the insulation film GI, the gate signal lines GL are formed such that the gate signal lines GL extend in the x direction and are arranged parallel to each other in the y direction in the drawing. Here, the gate signal line GL is formed so as to intersect a center portion of the semiconductor layer PS, and forms a gate electrode of the thin film transistor TFT at an intersecting portion.

Further, on an upper surface of the insulation film GI, an interlayer insulation film IN1 is formed in a state that the interlayer insulation film IN1 also covers the gate signal lines GL, and on an upper surface of the interlayer insulation film IN1, the drain signal lines DL are formed in a state that the drain signal lines DL extend in the y direction and are arranged parallel to each other in the x direction in the drawing. The drain signal line DL is electrically connected with one end of the semiconductor layer PS via a through hole which is formed in the interlayer insulation film IN1. A connection portion of the drain signal line DL which is connected with the semiconductor layer PS functions as a drain electrode DT of the thin film transistor TFT.

On an upper surface of the interlayer insulation film IN1, source electrodes ST of the thin film transistors TFT are formed, and each source electrode ST is electrically connected with another end of the semiconductor layer PS via a through hole which is formed in the interlayer insulation film IN1. The source electrode ST is electrically connected with a pixel electrode PX described later.

On an upper surface of the interlayer insulation film IN1, a sequentially stacked body constituted of a protective film PAS1 and a protective film PAS2 (see FIG. 3) is formed so as to also cover the thin film transistors TFT. The sequentially stacked body is provided for preventing the thin film transistors TFT from directly coming into contact with the liquid crystal LC. The protective film PAS1 is formed of an organic insulation film, and the protective film PAS2 is formed of an organic insulation film. The reason that the protective film PAS2 is formed of the organic insulation film is that the protective film PAS2 can be formed by coating so that a surface of the sequentially stacked body can be leveled.

On an upper surface of the protective film PAS2, counter electrodes CT (see FIG. 3) which are formed of a transparent conductive layer made of ITO (Indium Tin Oxide), for example, are formed. The counter electrode CT is formed of a surface electrode which extends over the neighboring pixel region, and also functions as a voltage counter signal line CL shown in FIG. 2. A hole (indicated by symbol HL in FIG. 1) is formed in a portion of the counter electrode CT which overlaps with the source electrode ST of the thin film transistor TFT. The hole is provided for avoiding electrical short-circuiting between the counter electrode CT and the pixel electrode PX when the pixel electrode PX described later and the source electrode ST are connected with each other via the through hole TH.

An interlayer insulation film IN2 is formed on an upper surface of the counter electrodes CT, and the pixel electrodes PX are formed on an upper surface of the interlayer insulation film IN2 at respective pixel regions. The pixel electrode PX is constituted of a transparent conductive layer made of ITO (Indium Tin Oxide), for example. Further, the pixel electrode PX includes a plurality of (for example, two) linear electrode portions which extends in the y direction and is arranged parallel to each other in the x direction in the drawing, and these linear electrode portions have thin-film-transistor-TFT-side end portions thereof electrically connected with each other.

Further, the pixel electrode PX is electrically connected with the source electrode ST of the thin film transistor TFT via the through hole TH formed in the interlayer insulation film IN2, the protective film PAS2 and the protective film PAS1 in a region where the plurality of linear electrode portions of the pixel electrode PX is connected with each other.

On an upper surface of the interlayer insulation film IN2 on which the pixel electrode PX is formed, an alignment film ORI1 is formed so as to also cover the pixel electrodes PX. The alignment film ORI1 decides the initial alignment direction of molecules of liquid crystal.

The counter substrate FBS which is arranged to face the above-mentioned TFT substrate TBS with the liquid crystal LC sandwiched therebetween is constituted as follows. First of all, the counter substrate FBS includes a substrate SUB2 (see FIG. 3) made of glass, for example, and black matrixes BM (light blocking films) are formed on a liquid-crystal-LC-side surface of the substrate SUB2.

For example, in this embodiment, the black matrixes BM are formed so as to cover the drain signal lines DL which are formed on the TFT-substrate-TBS side. Further, with respect to the respective black matrixes BM which are arranged parallel to each other in the x direction in the drawing, three neighboring black matrixes BM have different widths respectively, and the same width pattern is repeated for every three black matrixes BM in the x direction in the drawing. The widths of these black matrixes BM are explained in detail later.

Further, color filters are provided in such a manner that each color filter is formed between the neighboring black matrixes BM. These color filters FL are arranged in the x direction in the drawing in order of the green color filter FL(G), the red color filter FL(R), the blue color filter FL(B), the green color filter FL(G), the red color filter FL(R), . . . , for example. Regions which are covered with the red color filters FL(R) constitute red sub pixels PX(R), regions which are covered with the blue color filters FL(B) constitute blue sub pixels PX(B), and regions which are covered with the green color filters FL(G) constitute green sub pixels PX(G), and these sub pixels are arranged adjacent to each other in the x direction in the drawing. These three sub pixels having different colors constitute a unit pixel for color display.

An overcoat film OC which is formed of a resin film, for example, is formed on upper surfaces of these color filters, and a surface of the overcoat film OC is leveled. Further, an alignment film ORI2 is formed on an upper surface of the overcoat film OC, and the alignment film ORI2 decides the initial alignment direction of molecules of the liquid crystal LC.

Although not shown in the drawing, on a surface of the substrate SUB1 on a side opposite to the substrate SUB2, a backlight having a light source is arranged. When the retardation of the liquid crystal LC is set such that a transmissivity contrast ratio of the pixel is increased, light which passes through the liquid crystal becomes yellowish and hence, it is preferable to use a bluish light source which is a complementary color of yellow.

Here, the widths of the above-mentioned black matrixes BM are explained. Assuming the width of the black matrix BM arranged between the red sub pixel PX(R) and the blue sub pixel PX(B) as Wrb, assuming the width of the black matrix BM arranged between the green sub pixel PX(G) and the red sub pixel PX(R) as Wgr, and assuming the width of the black matrix BM arranged between the blue sub pixel PX(B) and the green sub pixel PX(G) as Wbg, a relationship of Wrb≠Wgr≠Wbg and a relationship of Wrb>Wbg>Wgr are established.

In the liquid crystal display device having the above-mentioned constitution, in a monochromatic display of the red sub pixel PX(R), when the display screen is viewed from oblique directions on a side where the blue sub pixel PX(B) is arranged adjacent to the red sub pixel PX(R), a drawback of color mixing which is generated by mixing blue is emphasized due to a bluish light source and becomes conspicuous. Accordingly, it is necessary to block light to which blue is mixed using the black matrix BM arranged between the red sub pixel PX(R) and the blue sub pixel PX(B). In this case, the increase of the width Wrb of the black matrix BM becomes inevitable.

On the other hand, in the red monochromatic display, when the display screen is viewed from oblique directions on a side where the green sub pixel PX(G) is arranged adjacent to the red sub pixel PX(R), a drawback of color mixing which is generated by mixing green is hardly viewed compared with the drawback of color mixing generated by mixing blue.

Further, it is confirmed that, a degree of viewing of color mixing in the observation of the display screen from oblique directions on a side where the blue sub pixel PX(B) is arranged adjacent to the green sub pixel PX(G) in a green monochromatic display is smaller than a degree of color mixing of blue in the monochromatic display of the red sub pixel PX(R) and is larger than a degree of color mixing of green in the monochromatic display of the red sub pixel PX(R). Accordingly, assuming the width of the black matrix BM arranged between the blue sub pixel and the green sub pixel as Wbg, the width Wbg can be set so as to satisfy the relationship of Wrb>Wbg>Wgr.

As has been explained heretofore, the liquid crystal display device of this embodiment can enhance a numerical aperture of each pixel compared with a case where widths of the black matrixes BM are uniformly increased.

(Embodiment 2)

Figure 4:
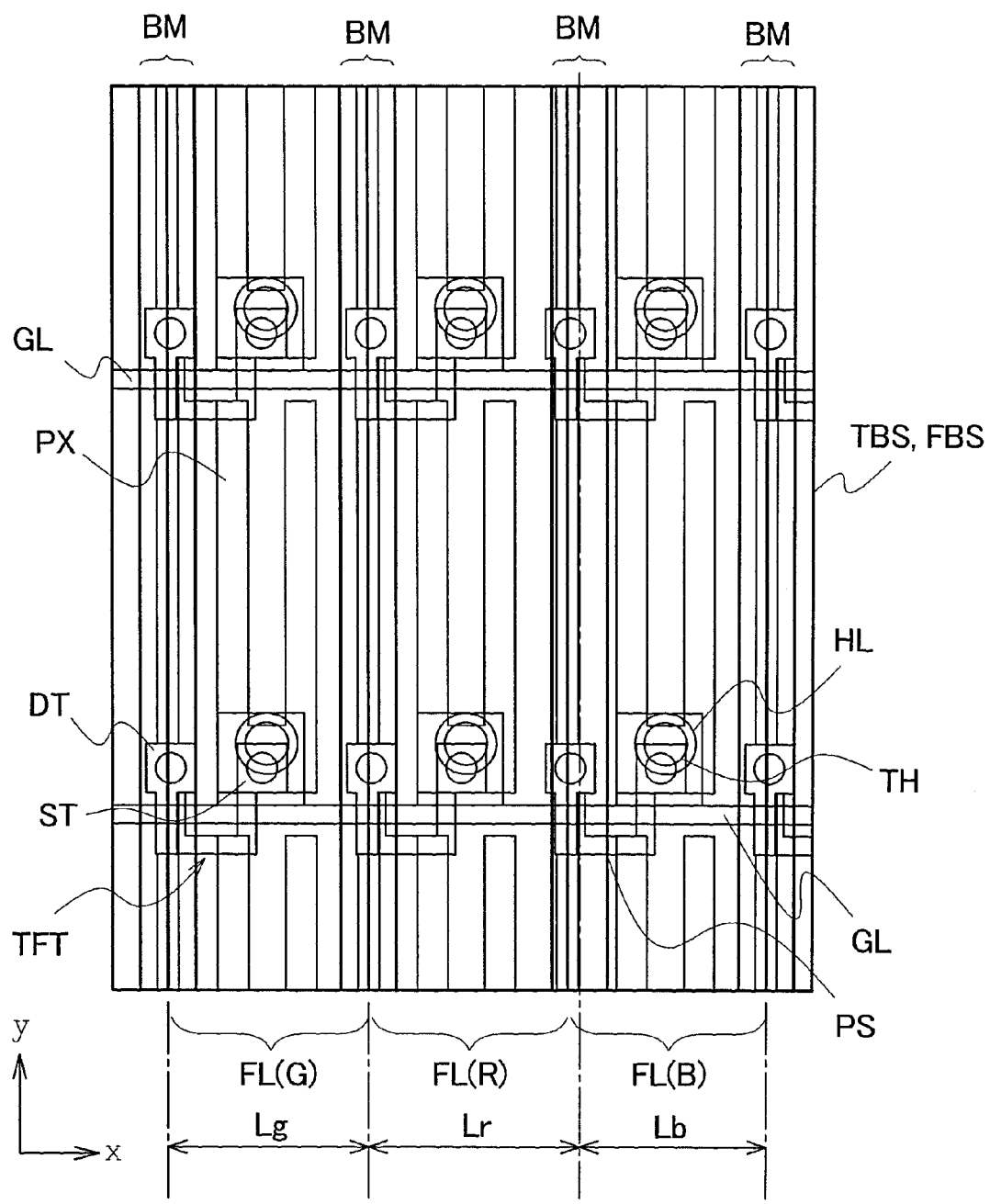
FIG. 4 is a plan view showing another embodiment of a liquid crystal display device of the present invention.

FIG. 4 is a constitutional view showing another embodiment of the liquid crystal display device according to the present invention, and FIG. 4 corresponds to FIG. 1.

In FIG. 4, to compare the constitution of this embodiment with the constitution shown in FIG. 1, first of all, a width of the black matrix BM arranged between the green sub pixel PX(G) and the red sub pixel PX(R), a width of the black matrix BM arranged between the red sub pixel PX(R) and the blue sub pixel PX(B), and a width of the black matrix BM arranged between the blue sub pixel PX(B) and the green sub pixel PX(G) are set equal. The widths of the respective black matrixes BM can be set to values which fall within a range allowable from a viewpoint of a numerical aperture of the sub pixel.

The black matrix BM arranged between the red sub pixel PX(R) and the blue sub pixel PX(B) is formed in a slightly displaced manner toward a blue sub pixel PX(B) side with respect to the drain signal line DL which is covered with this black matrix BM. Due to such formation of the black matrix BM, in a monochromatic display of the red sub pixel PX(R), when a display screen is viewed from oblique directions on a side where the blue sub pixel PX(B) is arranged adjacent to the red sub pixel PX(R), mixing of blue light can be blocked by the black matrix BM which is arranged in a displaced manner toward the blue sub pixel PX(B) side. In this embodiment, the respective drain signal lines are arranged at equal interval in the direction that the respective drain signal lines are arranged parallel to each other.

On the other hand, the black matrix BM arranged between the green sub pixel PX(G) and the blue sub pixel PX(B) and the black matrix BM arranged between the green sub pixel PX(G) and the red sub pixel PX(R) are formed with no displacement with respect to the drain signal lines DL which are covered with these black matrixes BM, and the center lines of the black matrixes BM and the drain signal lines DL are substantially aligned with each other. In a monochromatic display of the green sub pixel PX(G), even when blue is mixed in the observation of the display screen from oblique directions on a side where the blue sub pixel PX(B) is arranged adjacent to the green sub pixel PX(G), color mixing is hardly visually recognized so that the black matrix BM between the green sub pixel PX(G) and the blue sub pixel PX(B) can be formed in a usual form.

Due to such constitution, according to this embodiment, assuming a distance between the center of the black matrix BM arranged between the red sub pixel PX(R) and the blue sub pixel PX(B) arranged adjacent to the red sub pixel PX(R) and the center of the black matrix BM arranged between the red sub pixel PX(R) and the green sub pixel PX(G) arranged adjacent to the red sub pixel PX(R) as Lr, assuming a distance between the center of the black matrix BM arranged between the blue sub pixel PX(B) and the green sub pixel PX(G) arranged adjacent to the blue sub pixel PX(B) and the center of the black matrix BM arranged between the blue sub pixel PX(B) and the red sub pixel PX(R) arranged adjacent to the blue sub pixel PX(B) as Lb, and assuming a distance between the center of the black matrix BM arranged between the green sub pixel PX(G) and the blue sub pixel PX(B) arranged adjacent to the green sub pixel PX(G) and the center of the black matrix BM arranged between the green sub pixel PX(G) and the red sub pixel PX(R) arranged adjacent to the green sub pixel PX(G) as Lg, a relationship of Lr>Lg>Lb is established.

The liquid crystal display device having such a constitution can, in obviating color mixing of colors when the display screen is viewed from oblique directions, set the widths of the respective black matrixes to minimum values thus enhancing a numerical aperture of the pixels.

Although the embodiments have been explained in conjunction with the example in which the liquid crystal display device is an IPS-type liquid crystal display device, it is needless to say that the technique of the present invention is not limited to the IPS-type liquid crystal display device. That is, by applying the technique of the present invention to a VA (vertical alignment) type liquid crystal display device or a TN (twisted nematic) type liquid crystal display device, it is possible to avoid color mixing and, at the same time, to enhance a numerical aperture.

What is claimed is:

1. A liquid crystal display device comprising:
   a first substrate;
   a second substrate;
   a liquid crystal layer disposed between the first substrate and the second substrate;
   a first red color filter, a green color filter, a blue color filter, and a second red color filter disposed along a first direction;
   a first light blocking film disposed on the first red color filter and the green color filter;
   a second light blocking film disposed on the green color filter and the blue color filter;
   a third light blocking film disposed on the blue color filter and the second red color filter; and
   a first drain signal line, a first thin film transistor, and a first pixel electrode formed on the first substrate,
   wherein the first light blocking film overlaps the first drain signal line; and
   wherein the second light blocking film along the first direction is wider than the first light blocking film along the first direction.

2. The liquid crystal display device according to claim 1, further comprising a third drain signal line overlapping the third blocking film.

3. The liquid crystal display device according to claim 2, wherein at least a part of the first drain signal line overlaps the first red color filter.

4. The liquid crystal display device according to claim 3, wherein the first blocking film is wider than the first pixel electrode.

5. The liquid crystal display device according to claim 4, wherein the first pixel electrode is disposed in an upper layer compared to the drain line.

6. The liquid crystal display device according to claim 5, further comprising a common electrode formed on the first substrate.

7. The liquid crystal display device according to claim 6, further comprising a second drain signal line overlapping the second light blocking film.

* * * * *